United States Patent [19]

Kubesa

[11] 4,138,234
[45] Feb. 6, 1979

[54] HOLDER FOR ANNULAR FILTER

[75] Inventor: Frantisek Kubesa, Hasselroth, Neuenhasslau, Fed. Rep. of Germany

[73] Assignee: UOP Inc., Des Plaines, Ill.

[21] Appl. No.: 823,795

[22] Filed: Aug. 11, 1977

[30] Foreign Application Priority Data

Mar. 17, 1977 [DE] Fed. Rep. of Germany ... 7708188[U]

[51] Int. Cl.$^2$ ............................................ B01D 46/02
[52] U.S. Cl. ....................................... 55/374; 55/379; 55/492; 55/498; 55/499; 55/501; 55/502; 55/505; 55/DIG. 26
[58] Field of Search .................. 55/302, 374, 375, 378, 55/379, 492, 498, 499, 501–503, 505, 508, 511, DIG. 26; 210/461–463

[56] References Cited

U.S. PATENT DOCUMENTS

| | | | |
|---|---|---|---|
| 1,324,635 | 12/1919 | Ascoli | 55/379 X |
| 1,607,989 | 11/1926 | Knight | 210/463 |
| 2,661,078 | 12/1953 | Vance | 55/502 X |
| 3,167,415 | 1/1965 | Edwards | 55/302 |
| 3,844,750 | 10/1974 | Ray | 55/379 |
| 3,856,489 | 12/1974 | Vokral | 55/379 |

Primary Examiner—Frank W. Lutter
Assistant Examiner—Kathleen J. Prunner
Attorney, Agent, or Firm—James R. Hoatson, Jr.; Barry L. Clark; William H. Page, II

[57] ABSTRACT

Holder for an annular filter includes a support frame or basket with a flared portion at its upper end which cooperates with the inner leg of an inverted U-shaped sealing ring to clamp the upper end of the filter. The sealing ring has its outer leg seated on a sealing gasket positioned on top of a support plate surrounding an aperture through which the filter is lowered during operation of a particle collection apparatus. The holder is replaceably sealed in position by screwing a pair of threaded rings together to force the flared portion downwardly. The diameters of the various parts are larger than the aperture to prevent them from being dropped through the aperture and the overall design is such that the filters can be replaced from the upper clean side of the collection apparatus rather than the lower dirty side.

4 Claims, 2 Drawing Figures

HOLDER FOR ANNULAR FILTER

BACKGROUND OF THE INVENTION

The invention relates to holders of the type used for the attachment and sealing of bag-like annular filter tubes which comprise a supporting basket suspended from an end plate. The supporting basket has a venturi tube at its upper end which merges upwardly and outwardly into a widened-out annular collar, the conically constructed annular face of which can be pressed against a sealing ring, the filter tube being interposed between the sealing ring and the annular face.

Threaded holders of this type are used for attaching a filter tube unit to the end plate in a container, particularly in air purifying installations, in order to cleanse the air emanating from an industrial process which is contaminated by small particles. The purpose of the threaded holder is to secure the filter tube in sealing-tight fashion to the end plate but permit easy replacement of the filter tube when it becomes torn or clogged.

A known threaded holder of the aforementioned type is disclosed in U.S. Pat. No. 3,856,489. The known holder has two conical portions which, for sealing the filter tube, have to be moved onto each other and against a threaded supporting means which is suspended from the end plate. The filter tube is clamped between these conical portions along which a continuous seal is formed. The purpose of this is to prevent unfiltered air passing into a part of the unit carrying the filtered or purified air. However, the known threaded holder also has a second seal between the top of the annular collar of the tube and a portion of the threaded supporting means to provide a double seal and to prevent unfiltered air leaking into the filter unit. For example, it may happen that the first-mentioned seal with the two conical portions becomes defective due to irregularities, whereupon this secondary seal is intended to take over the sealing function.

A disadvantage of the known threaded holder is that the filter tube, the supporting basket and also the screwed holder must be detached from the side on which the dust-laden gas or air is present, i.e. from the underside of the end plate. It can happen that parts of the known attachment will fall into the collecting bin and damage the delivery means when the plant is started. Also, it is very dirty in the compartment containing the bags and thus a very undesirable place in which to work.

SUMMARY

The object of the invention is to improve the known threaded holder so that, while providing an optimum sealing effect with the simplest of means, the threaded connection is made from the purified side of the filter, i.e., above the end plate, and with no possibility that any part of the holder assembly can fall into the collecting bin.

According to the invention, a sealing ring is supported on top of a sealing gasket on the circular rim of the end plate. A base member which includes an integral base ring is attached by rivets or bolts to the end plate top surface so as to surround the sealing ring. A conical sealing face is provided between the sealing ring and the annular collar with the interposed filter tube, but the sealing ring is not, as it is in the known case, a portion of a screwed cap but is instead a separate inverted U-shaped element supported on the circular rim of the end plate which defines the aperture through which the filter tube extends down into the dust-laden gas chamber. Positioned on the supporting surface, between the sealing ring and the rim of the end plate, is an annular gasket member. Sealing of the dust-laden gas chamber on one side in relation to the clean gas chamber on the other side is effected therefore between the first-mentioned seal between the two conical faces with the clamped-in filter medium on the one hand, and between the sealing ring and the annular gasket below it, on the other. It is desirable for the side of the inverted U-shaped sealing ring which is opposite the widened-out annular collar of the venturi tube to have the same conical sealing surface as the said annular collar so that the filter tube can be tightly clamped therebetween as the collar is forced down by a threaded locking ring engaged with the base ring so that it will rest snugly against the sealing surfaces. Preferably, the diameters of the sealing ring, the base ring and the locking ring are all larger than the diameter of the aperture in the end plate. The end plate is the boundary between the dust-laden chamber and the clean gas chamber. The aperture in the end plate is fully occupied by the filter tube. By dimensioning all the parts of the sealing arrangement such that the aforementioned ratio of diameters is achieved, the parts cannot possibly fall into the collecting bin and damage the discharge elements, such as for example, augers, bucket wheel sluices and the like. Thus, it is possible for servicing personnel to exchange the filter media from the clean gas side of the filter without having to take any special care in handling the individual parts of the threaded holder.

As previously noted, the sealing ring preferably has a cross-section more or less in the shape of an inverted U. One free leg, namely that having the larger diameter, supports the sealing ring against the sealing gasket and the rim of the aperture in the end plate. The opposite leg of the U is preferably shaped to conform to the angle of the annular collar of the venturi tube to insure an extended contact surface for locking the filter tube in position.

It is also preferable that the height of the base ring projecting up from the bottom plate is less than the height of the raised annular collar of the venturi tube. This measure insures that when the locking ring is screwed onto the base ring it will press the supporting basket with the venturi tube downwards against the sealing surface of the sealing ring. As a result, the annular sealing gasket is pressed against the rim of the aperture in the end plate so that an optimum sealing effect is guaranteed between the dust-laden gas chamber and the clean gas chamber.

With the design according to the invention, it is possible to quickly and easily change the filter medium, i.e., the filter tube by merely unscrewing the locking ring from the base ring. A pair of lugs on the locking ring permit this to be easily done by hand.

DESCRIPTION OF THE PREFERRED EMBODIMENT

Figure 1:
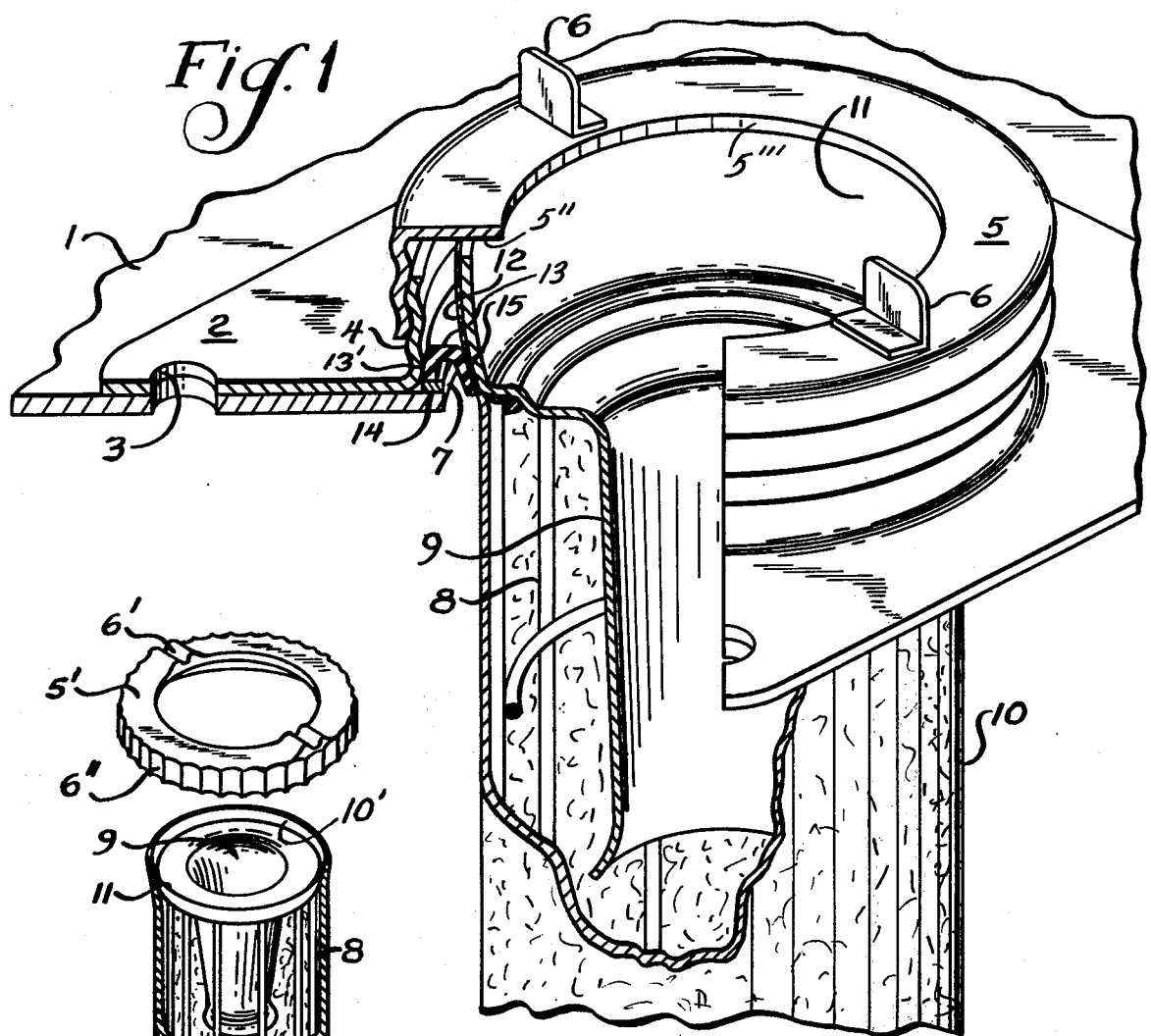
FIG. 1 shows a partly cut away and sectional view of the threaded holder including the filter tube and supporting basket.

The horizontal support or end plate 1 is rigidly mounted in the air purifying chamber, not shown. A base member 2 is mounted on the end plate by means of screws or rivets not shown but which can be passed through the bores 3. The base member 2 has an upstanding base ring portion 4 which carries on its outer face a screwthread indicated in FIG. 1. Corresponding to this screwthread there is a female screwthread on a locking cap or ring 5 which can, without the use of small tools such as for example a screwdriver or wrench, be tightened down onto the base ring 4; this screwing action may be performed either by the fluted edge 6" and the molded grip members 6' provided in diametrically opposed relationship on the locking ring 5' as in the case of the embodiment shown in FIG. 2, or by means of welded ribs 6 as in the embodiment shown in FIG. 1.

The support basket 8 has the venturi tube portion 9 mounted on it such as by welding. The filter tube 10, which is preferably made of a cloth fabric, is placed, with its open end wall portion 10' facing upwardly, through the aperture 7 in the end plate 1, the edge of which can be seen in FIG. 1.

Figure 2:
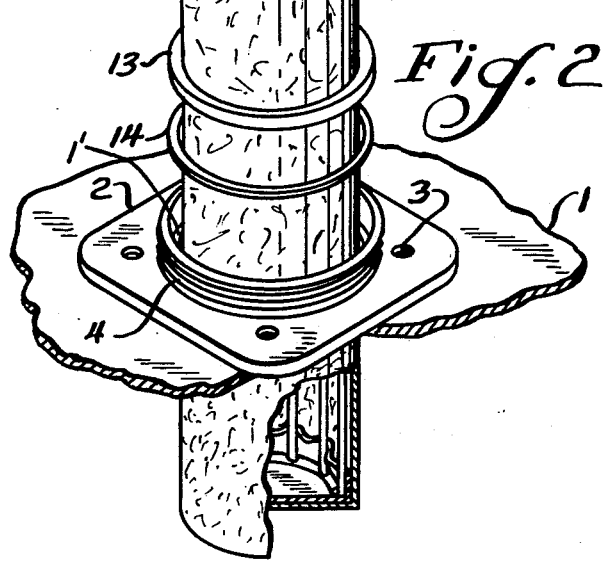
FIG. 2 is a diagrammatic perspective exploded view of the individual parts of the threaded holder but utilizes a modified locking cap.

The venturi tube portion 9 has an upwardly and outwardly flared annular collar portion 11 which has a conical annular face at the location designated 12 in FIG. 1. In an outwards direction, there is alongside this annular face 12 a sealing ring 13, the cross-section of which is U-shaped, and which is supported at the bottom of one leg 13', through an annular sealing gasket 14, on the rim 1' of the aperture 7 in the end plate 1. Opposite the conical annular face 12 on the venturi tube portion 9 a corresponding tapered wall surface 15 is provided by the oblique attitude of one leg, namely the inner leg, of the U-shaped sealing ring 13. The filter tube 10 is pulled upwardly and around the flared annular collar portion 11, as shown in FIG. 1.

The drawings reveal the ease with which the threaded holder can be assembled and dismantled and also the perfect sealing action which results from the fact that the locking ring 5 is screwed up tight, which automatically presses its horizontal portion 5" which surrounds central aperture portion 5'" against the flared annular collar portion 11 downwards against the tapered wall surface 15 of the sealing ring 13, the flatly compressed filter tube 10 being interposed between the said two parts. In turn, this does at the same time provide for sealing-tight pressure of that leg 13' of the sealing ring 13 which is opposite the leg 15 down onto the annular sealing gasket 14 and thus onto the rim of the aperture 7 in the end plate 1.

When a filter tube 10 needs to be changed, the drawings furthermore show the ease with which it can be unscrewed and exchanged without any movable parts of the threaded holder being able to fall down into the dust-laden gas chamber through the aperture 7 in the end plate 1.

It is not intended that the invention be confined to a screw-threaded connection between the base ring portion 4 and the locking ring 5 or 5'. Such a connection can also be achieved by a bayonet connection or by other types of connection which guarantee rapid detachment of both parts with simultaneous parallelity of the mating surfaces. The parts of the holder may be made of any suitable material, usually metal, although the locking ring 5' in FIG. 2 could be made of molded plastic, for example.

I claim as my invention:

1. A holder attached to a horizontal support plate, said holder comprising a support basket having at its upper end a venturi tube portion with an upwardly and outwardly extending flared collar portion, a sealing ring having a tapered wall surface which cooperates with said flared collar portion to lock the open end wall portion of an open ended annular bag type filter within which said support basket is suspended between said tapered wall surface and said collar portion when a downward force is applied to the upper peripheral edge of said collar portion, said support plate containing a circular aperture of sufficient diameter to accommodate those portions of said support basket which are located below said collar portion, the horizontal rim surface of said support plate surrounding and defining said circular aperture serving as a support for an outer peripheral portion of said sealing ring, a sealing gasket positioned between said rim surface and said outer peripheral portion of said sealing ring, a threaded base ring fixed to and extending upwardly from said support plate about the aperture, a complementary threaded locking ring in threaded engagement with said base ring, said locking ring having an aperture in its center aligned with said venturi tube portion and a horizontal portion surrounding said center aperture which engages the upper peripheral edge of said flared collar portion and applies a locking force on said filter as said locking ring is rotated toward said support plate.

2. A holder according to claim 1 wherein the diameters of the sealing ring, the base ring and the locking ring are all larger than the diameter of the circular aperture in the support plate while the maximum diameter of the venturi tube portion is smaller.

3. A holder according to claim 2 wherein the sealing ring has more or less the cross-sectional shape of an inverted U.

4. A holder according to claim 3 wherein the height of the base ring rising from the support plate is smaller than the height of the flared collar portion on the venturi tube portion which extends above the support plate.

* * * * *